United States Patent Office

PTO - BOYERS, PA Duty Station

MISSING PAGE TEMPORARY NOTICE

PATENT # 6912 X FOR ISSUE DATE 1-26-1832

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

Data Conversion Operation

Boyers, Pa

6912X

UNITED STATES PATENT OFFICE.

BANCROFT WOODCOCK, OF MOUNT PLEASANT, PENNSYLVANIA.

IMPROVEMENT IN SELF-SHARPENING PLOWS.

Specification forming part of Letters Patent dated January 26, 1832.

*To all whom it may concern:*

Be it known that I, BANCROFT WOODCOCK, of Mount Pleasant, Pennsylvania, have invented certain Improvements in the Self-Sharpening Plow; and I do hereby declare that the following is a full and exact description thereof.

In the self-sharpening plow as heretofore made the front part of the landside is cast in one piece with the mold-bold, and as the bottom edge of the landside wears the part forming the groove into which the colter slides gives way and cannot be renewed without renewing the whole casting. To obviate this objection I cast the landside separately from the mold-board, either in one or two pieces, as may be preferred. When made in two pieces they have a lap-joint at or near the middle, which may be secured by a bolt and nut. Suitable holes to receive bolts and nuts to attach the landside and mold-boards together are also provided.

In forming the pattern for the mold-board I make its top to terminate in a standard or sheth extending up to the beam and attach it thereto by a bolt and nut or otherwise, and in forming the pattern of the landside the front end of it is made with an arm or piece extending up so as to form a colter.

For plowing in rough or stony land I dispense with the colter as ordinarily made, and substitute therefor what I call a "pointed shank," passing it into the groove and securing it in the same way with the colter. When I use this an erect colter stands in front of it, the upper end of which is secured to the beam in any of the known ways. A hole or depression is made in the heel of the erect colter, and into this the point of the shank passes, which serves to support and keep it steady.

The respective parts herein named will be better understood by reference to the drawing deposited in the Patent Office.

What I claim as my specific improvements, and for which I ask a patent, is—

1. The casting of the landside separately from the mold-board, either in one or two pieces, as hereinbefore set forth.
2. The shank, as described, to be used in lieu of the ordinary colter, with its point entering the heel of the erect colter, in the manner and for the purposes specified.

BANCROFT WOODCOCK.

Witnesses:
THOS. P. JONES,
ROBERT CLARKE.